United States Patent [19]
Yoshida et al.

[11] Patent Number: 4,959,258
[45] Date of Patent: Sep. 25, 1990

[54] JOINED METAL-CERAMIC ASSEMBLY METHOD OF PREPARING THE SAME

[75] Inventors: Akihiko Yoshida, Iwakura; Naohito Yamada, Nagoya, both of Japan

[73] Assignee: NGK Insulators, Ltd., Japan

[21] Appl. No.: 288,423

[22] Filed: Dec. 22, 1988

[30] Foreign Application Priority Data

Dec. 28, 1987 [JP] Japan ................. 62-335246

[51] Int. Cl.$^5$ ............................ B32B 15/04
[52] U.S. Cl. .................. 428/192; 156/304.3; 403/272; 428/457; 428/469
[58] Field of Search .......... 403/272; 420/558; 428/457, 469, 192; 156/304.3, 304.2, 304.1

[56] References Cited
U.S. PATENT DOCUMENTS
2,636,820 4/1953 Bolton .................... 403/272

FOREIGN PATENT DOCUMENTS
0232603 8/1987 European Pat. Off. ........... 403/272
59-092167 9/1984 Japan .
59-160533 10/1984 Japan .
60-82267 5/1985 Japan .
60-255679 12/1985 Japan .
62-6773 1/1987 Japan .

OTHER PUBLICATIONS
Abstract of Japanese No. 59-92167, May 28, 1984.

Primary Examiner—Thomas J. Herbert
Attorney, Agent, or Firm—Arnold, White & Durkee

[57] ABSTRACT

A joined metal-ceramic assembly formed from a ceramic member and a metallic member which are butted and joined together with an intermediate layer interposed therebetween, wherein a joining surface of the ceramic member at which the ceramic member is joined with the intermediate layer includes a rounded peripheral portion which has a substantially arcuate cross sectional shape and the method of producing the metal-ceramic assembly.

10 Claims, 4 Drawing Sheets

JOINED METAL-CERAMIC ASSEMBLY METHOD OF PREPARING THE SAME

BACKGROUND OF THE INVENTION

1. Field of the Invention

The present invention relates in general to a joined metal-ceramic assembly or structure, and more particularly to a metal-ceramic assembly obtained by brazing a metal member and a ceramic member such that the metal and ceramic members are butted together with an intermediate layer interposed therebetween. The invention is also concerned with a method of preparing such a joined metal-ceramic assembly.

2. Discussion of the Prior Art

In recent years, ceramic materials have been increasingly evaluated by their excellent properties and utilized for various industrial applications, for example, as piston caps, turbocharger rotors and gas turbine rotors. To keep pace with the increasing utilization of ceramic materials, various methods of joining together a ceramic member and a metallic member have been proposed.

According to one of the proposed joining methods, a separate intermediate layer is interposed between the joining surfaces of a ceramic member and a metallic member when these two members are butted together. For example, laid-open Publication No. 59-160533 of unexamined Japanese Utility Model Application discloses a method wherein a joined ceramic-metal structure is prepared by joining a ceramic member and a metallic member with a tungsten (W) or molybdenum (Mo) clad member interposed between the joining surfaces of the ceramic and metallic members. Another method is disclosed in laid-open Publication No. 60-255679 of unexamined Japanese Patent Application, in which an intermediate brazing metal layer interposed between a ceramic and a metallic member is machined to remove a portion of the brazing metal layer so that the brazing metal does not contact the ceramic and metallic members, except the joining surfaces. A further method is proposed in laid-open Publication No. 62-6773 of unexamined Japanese Patent Application, in which a ceramic shaft and a metallic shaft are joined together such that a short intermediate metal shaft having a lower Young's modulus than the ceramic and metallic shafts is interposed therebetween.

However, the above-indicated joining methods wherein the ceramic and metallic members are butted together suffer from a problem that the prepared ceramic-metal structure has a residual stress at the joining surfaces of the ceramic and metallic members due to a difference in coefficient of thermal expansion, and therefore, the structure does not have sufficient joining strength.

Described more specifically, the metallic and ceramic members are butted together while they are heated. when the joined metal-ceramic structure, which assumes a nominal shape at the elevated joining temperature, is cooled, the metallic member having a higher coefficient of thermal expansion than the ceramic member contracts more than the ceramic member, causing tensile stresses to be exerted on the peripheral portion of the joining interface of the two members. Such stresses may result in separation or cracking of the two members, which originates at the periphery of the joint.

While various types of intermediate layers to be interposed between the ceramic and metallic members have been proposed, the problem addressed above cannot be sufficiently solved, since the intermediate layer is not used for the purpose of eliminating the residual stresses at the peripheral portion of the joining surfaces. Namely, joined metal-ceramic assemblies or structures produced according to the known methods still suffer from residual stress concentration on the peripheral portion of the joined end of the ceramic member, which considerably reduces the joining strength. Thus, the difference in coefficient of thermal expansion between the ceramic and metallic members causes an undesirable residual stress at the joined end of the ceramic member, whereby the obtained metal-ceramic assembly is not provided with a sufficiently high degree of bonding strength.

SUMMARY OF THE INVENTION

The present invention was developed to solve the problem encountered in the prior art as described above. It is therefore an object of the present invention to provide a joined metal-ceramic assembly which has increased joining strength at the joining interface between a metallic and a ceramic member.

The above object may be achieved according to the principle of the present invention, which provides a joined metal-ceramic assembly formed from a ceramic member and a metallic member which are butted and jointed together with an intermediate layer interposed therebetween, wherein a joining surface of the ceramic member at which the ceramic member is joined with the intermediate layer includes a rounded peripheral portion which has a substantially arcuate cross sectional shape.

In the joined metal-ceramic assembly or structure constructed according to the present invention as described above, the peripheral portion of the joining surface of the ceramic member at which the ceramic member is joined with the intermediate layer is rounded so as to provide an arcuate cross-sectional shape having a suitable radius of arc, or a substantially arcuate cross-sectional shape. This rounded peripheral portion of the joining surface of the ceramic member effectively reduces the stress concentration at the periphery of the joining surface of the ceramic member, which would take place in a considerable degree in the prior art counterpart, due to a difference in coefficient of thermal expansion between the ceramic and metallic members which are butted together at the joining surfaces. Accordingly, the amount of residual stresses in the joined and cooled metal-ceramic assembly is significantly reduced, whereby the assembly is protected against otherwise possible cracking of the ceramic member or separation of the same from the metallic member, and the joining strength of the assembly is effectively increased.

Thus, the present invention provides an improved metal-ceramic assembly or structure having increased joining or bonding strength, for example, a turbocharger rotor which has a ceramic shaft and a metallic shaft that are firmly joined together.

Another object of the present invention is to provide a method of producing a joined metal-ceramic assembly or structure. This object may be attained according to another aspect of the invention, which provides a method wherein a metallic member, and a ceramic member having a joining surface which includes a rounded peripheral portion are butted together, such that an intermediate layer is interposed between a joining surface of the metallic member and the joining surface of the ceramic member. The metallic member, ceramic member and intermediate layer are joined together in a suitable manner. The instant method may be suitably practiced to join a ceramic member to a metallic member to obtain a desired metal-ceramic structure or assembly such as a shaft of a turbocharger rotor, as indicated above.

In one form of the invention, at least a half, preferably, at least two-thirds of the rounded peripheral portion of the joining surface of the ceramic member is bonded to the intermediate layer.

Alternatively, the rounded peripheral portion of the joining surface of the ceramic member may be covered by a corresponding peripheral portion of the intermediate layer.

The intermediate layer may include a metallic intermediate member and a pair of brazing metal layers formed on opposite surfaces of the intermediate member, so that the metallic and ceramic members are bonded together by means of the brazing metal layers.

In another form of the invention, the metallic member has a recess formed in a joining surface thereof, and the intermediate layer is accommodated in the recess. In this case, the recess of the metallic member may have a larger size than an area of the joining surface of the ceramic member, as viewed in a plane parallel to the joining surface of the ceramic member, and the rounded peripheral portion of the joining surface of the ceramic member may be covered by a corresponding peripheral portion of the intermediate layer.

In a further form of the invention, the ceramic member has a protrusion which defines a part of the joining surface. In this case, the metallic member has a suitable recess which accommodates a central portion of the intermediate layer and/or the protrusion of the ceramic member. The rounded peripheral portion may be covered by a corresponding peripheral portion of the intermediate layer, which corresponding peripheral portion is not accommodated in the recess.

BRIEF DESCRIPTION OF THE DRAWINGS

The above and optional objects, features and advantages of the present invention will be better understood by reading the following detailed description of some presently preferred embodiment of the invention, when considered in conjunction with the accompanying drawings, in which.

DETAILED DESCRIPTION OF THE PREFERRED EMBODIMENTS

Figure 1:
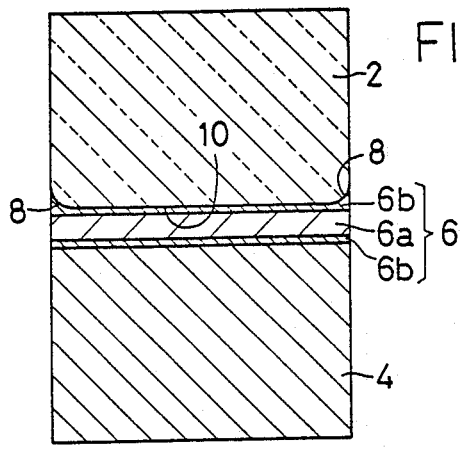
FIGS. 1, 2, 4, 5 and 6 are elevational views in longitudinal cross section of different embodiments of the joined metal-ceramic assemblies or structures of the present invention.

Referring first to FIG. 1, reference numerals 2 and 4, respectively, denote a ceramic member and a metallic member in the form of cylinders which are to be joined together into a joined metal-ceramic assembly or structure. Suitable known ceramic and metallic materials are selected as desired for these ceramic and metallic members 2 and 4, depending upon the required properties and applications of the produced assemblies. For instance, the ceramic member 2 may be formed of silicon nitride, silicon carbide, sialon, zirconia, mullite, alumina or beryllia, and the metallic member 4 is formed of carbon steel, stainless steel, nodular graphite cast iron, nickel-chrome-molybdenum steel, chrome-molybdenum steel, aluminum-chrome-molybdenum steel, maraging steel, precipitation-hardened superalloy, and superalloys such as incoloy. The metallic member 4 may be partially or entirely precipitation-hardened, nitrided, high frequency quenched, or otherwise hardened, as needed.

The ceramic and metallic members 2 and 4 are butted and joined together by a suitable known method, for example, brazing, diffusion bonding or melting bonding, alone or in combination thereof. In any case, the ceramic and metallic members 2 and 4 are joined by means of a disk-like intermediate layer 6 interposed therebetween as a bonding layer.

In the specific embodiment of FIG. 1, the intermediate layer 6 is constituted by a brazing sheet which consists of an intermediate metallic plate 6a, and a pair of brazing metal layers 6b, formed on the opposite surfaces of the intermediate plate 6a. Namely, the ceramic and metallic members 2 and 4 of the assembly of FIG. 1 are joined together by a known brazing technique. The intermediate layer 6 may consists solely of a brazing metal layer (6b) formed of a suitable brazing material. The intermediate metallic plate 6a is preferably formed of a material having lower yield strength than the material of metallic member 4, such as Cu, Al, Zn, Ti, Pb, Pt, Au, Ag, and alloys thereof. These materials may be suitably used for the brazing metal layers 6b.

The joined, metal-ceramic assembly formed by joining the ceramic and metallic members 2 and 4 with the intermediate layer 6 interposed therebetween according to the present invention, is characterized by a rounded peripheral portion 8 of a joining surface 10 of the ceramic member 2 at which the ceramic member 2 is joined with the corresponding surface of the proximate brazing metal layer 6b, as indicated in FIG. 1. The rounded peripheral portion 8 has a substantially arcuate cross-sectional shape as viewed in a plane parallel to the intermediate layer 6. At least a half, preferably at least two-thirds, of the surface area of the rounded peripheral portion 8 is preferably covered or contacted by or joined with the corresponding peripheral portion of the intermediate layer 6, more precisely, the proximate brazing metal layer 6b. In the specific example of FIG. 1, the rounded peripheral portion 8 is substantially entirely covered by the brazing metal layer 6b. The rounded peripheral portion 8 functions to reduce the degree of stress concentration on the ceramic member 2 which arises from a difference in coefficient of thermal expansion between the ceramic and metallic members 2 and 4. Thus, the rounded peripheral portion 8 contributes to minimizing the amount of residual stresses in the produced metal-ceramic assembly or structure.

In the specific embodiment of FIG. 1, the intermediate layer 6 consists of the intermediate metallic plate 6a and the two brazing metal layers 6b. The peripheral portion of the brazing metal layer 6b proximate the ceramic member 2 bonds the rounded peripheral portion of the joining surface 10 of the ceramic member 2 and the corresponding peripheral portion of the metallic plate 6a. Therefore, the ceramic member 2 is joined with or contacted by the metallic plate 6a via the brazing layer 6b, i.e., joined with or contacted by the intermediate layer 6, not only at the joining surface 10 including the rounded peripheral portion 8, but also at the area of the outer surface of the ceramic member 2 adjacent the rounded peripheral portion 8. Consequently, a radial compressive stress is exerted on the circumferential surface of the joined end portion of the ceramic member 2. This compressive stress does not contribute to mechanical destruction of the ceramic member 2, but rather, effectively contributes to mitigating or reducing the residual stress in the metal-ceramic structure.

Figure 2:
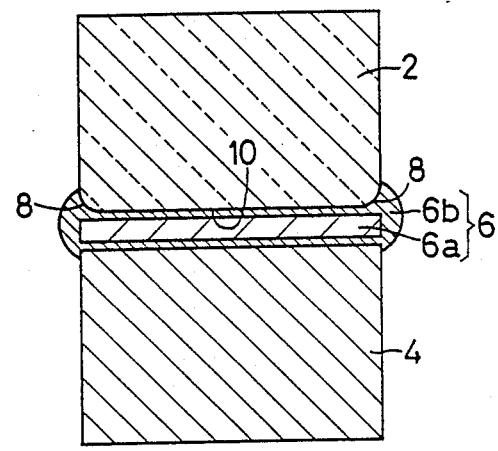

In the metal-ceramic assembly shown in FIG. 1, the peripheral surface of the intermediate layer 6 is flush with the adjoining outer surface of the ceramic member 2, since a brazing flux (6b) formed as a bead on the circumference of the joint of the assembly during the brazing with the brazing layers 6b is removed. However, such a brazing flux covering the periphery of the plate 6a may remain on the produced assembly of the ceramic and metallic members 2 and 4, as indicated in FIG. 2, if the flux does not cause any inconvenience.

For obtaining a sufficient effect of the rounded peripheral portion 8 on the bonding or joining strength of the metal-ceramic assembly or structure, it is desirable that at least one half, preferably, at least two-thirds, of the rounded peripheral portion 8 is joined with or contacted by the corresponding peripheral portion of the intermediate layer 6, irrespective of whether the brazing flux on the circumference of the assembly is removed or not. Described differently referring to FIG. 3(a), the edge of the intermediate layer 6 indicated at 14 on the ceramic member 2 is preferably located further outward with respect to a midpoint 12 on the circular arc of the rounded peripheral portion 8 of the joining surface 10.

Figure 3A:
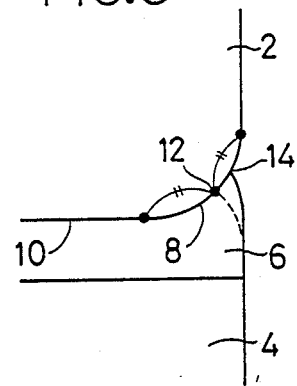
FIGS. 3(a) and 3(b) are enlarged fragmentary illustrations showing different manners of joining at the peripheral portions of ceramic members and intermediate layers.
Figure 3B:
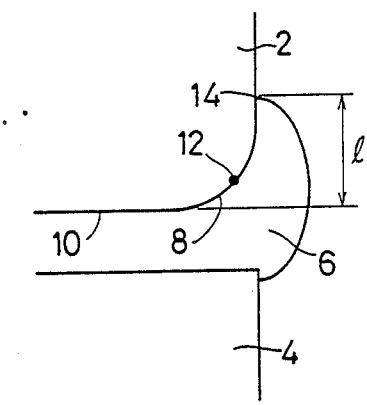

The intermediate layer 6 used for the assemblies of FIGS. 3(a) and 3(b) consists solely of a brazing metal.

The arc radius R of the substantially arcuate rounded peripheral portion 8 of the ceramic member 2 is determined as needed depending upon the size of the joining surface 10, the difference in coefficient of thermal expansion between the ceramic and metallic members 2 and 4, and other factors. Generally, the rounded peripheral portion 8 has an arc radius of at least 0.3 mm, preferably, at least 0.5 mm.

The term "substantially arcuate" used in connection with the rounded peripheral portion 8 is interpreted to mean any curvatures which include a circular arc, a part of a profile of an ellipse, and a curvature consisting of a circular arc and a part of the ellipse.

In the embodiment of FIG. 3(b), the edge 14 of the intermediate layer 6 is not located on the rounded peripheral portion 8 on the joining surface 10 of the ceramic member 2, but rather is located on the circumference of the ceramic member 2. In this case, a distance "l" between the edge 14 of the intermediate layer 6 on the ceramic member 2 and the joining surface 10 as measured in the direction normal to the surface 10 is preferably less than 2mm, more preferably less than 1 mm. The distance "l" between the edge 14 and the surface 10 should not be excessively large, in order to assure a relatively reduced amount of stress at the edge 14, since the amount of stress increases with the distance.

Figure 4:
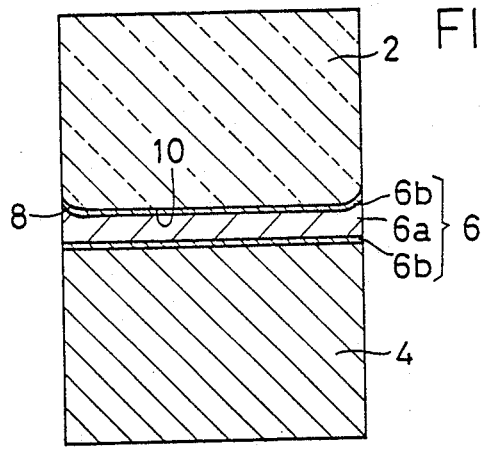
Figure 5:
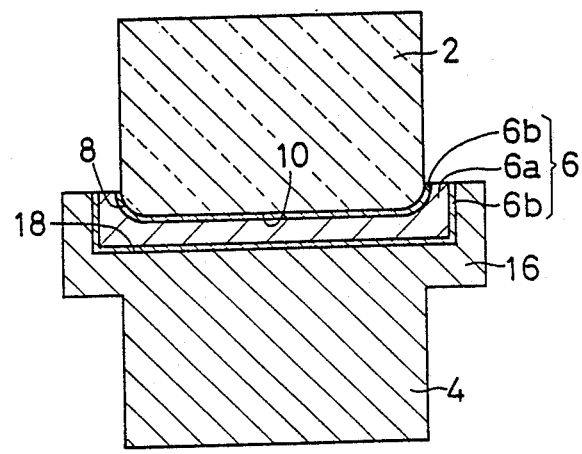
Figure 6:
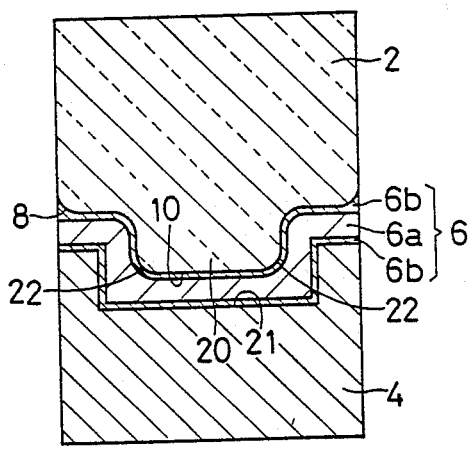

While the intermediate layer 6 interposed between the ceramic and metallic members 2 and 4 of the above-illustrated embodiments is relatively simple, the layer 6 may be modified as illustrated in FIGS. 4–6.

In the embodiment of FIG. 4, the peripheral portion of the intermediate metallic plate 6a of the intermediate layer 6 has a cross sectional shape following the curvature of the rounded peripheral portion 8 of the ceramic member 2. In this case, a radial compressive force applied to the circumference of the ceramic member 2 at the joined end portion can be effectively increased by the peripheral portion of the metallic plate 6a. While the intermediate layer 6 having the metallic plate 6a with the thus shaped peripheral portion is brazed to the joining surface 10 of the ceramic member 2 via the brazing metal layer 6b proximate the member 2, it is possible that the metallic plate 6a is substantially directly bonded to the ceramic member 2.

In the embodiment shown in FIG. 5, the metallic member 4 is formed with a flange at the joined end portion. This flange 16 has a larger diameter than the ceramic member 2 and has a recess 18 in which the intermediate layer 6 is accommodated so as to join the ceramic and metallic members 2 and 4. In this respect, the instant embodiment of FIG. 5 is different from the embodiment of FIG. 4. The peripheral portion of the intermediate layer 6 accommodated in the recess 18, is bent so as to cover the rounded peripheral portion 8 of the ceramic member 2, as indicated in FIG. 5, whereby a relatively large radial compressive force is exerted on the rounded peripheral portion 8 of the ceramic member 2.

In the further modified embodiment of FIG. 6, the ceramic member 2 and the metallic member 4 are joined together at their convex and concave end portions, by means of the intermediate layer 6. More specifically, the joined end portion of the ceramic member 2 is formed with a central protrusion 20 which defines a part of the joining surface 10, while the joined end portion of the metallic member 4 is formed with a recess 21 in which a central portion of the intermediate layer 6 is accommodated. The rounded peripheral portion 8 of the ceramic member 2 is covered by the peripheral portion of the intermediate layer 6, which is not accommodated in the recess 21. The edge of the protrusion 20 is rounded as indicated at 22 in FIG. 6, to an arcuate shape having a suitable radius of arc.

While the presently preferred embodiments of the invention have been described and illustrated, it is to be understood that the invention may be embodied with various changes, modifications and improvements, which may occur to those skilled in the art, without departing from the spirit of the invention defined in the appended claims.

The advantage of the rounded peripheral portion 8 of the joining surface 10 of the ceramic member 2 will become more apparent from the results of an experiment conducted on some examples described below.

Figure 7A:
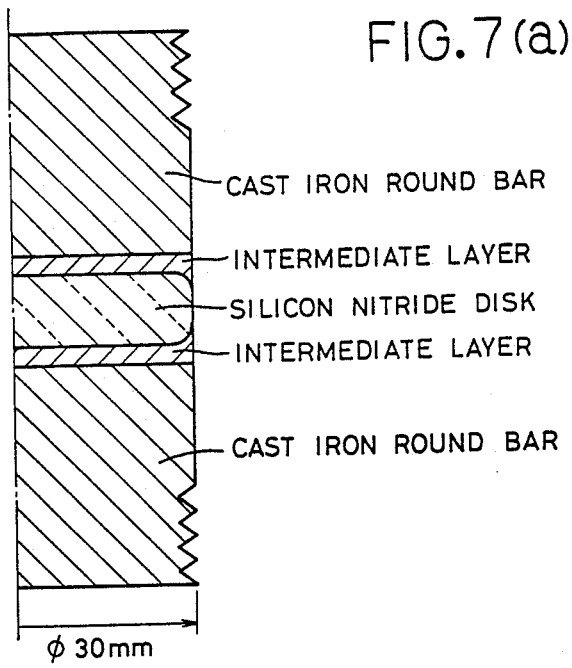
FIG. 7(a) is an elevational view in axial cross-section, showing half of a specimen of the joined metal-ceramic assembly of the invention prepared for a testing purpose.
Figure 7B:
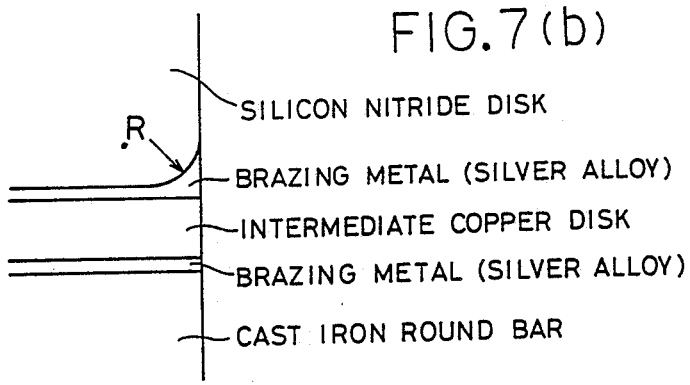
FIGS. 7(b) and 7(c) are enlarged fragmentary illustrations, depicting different states of the periphery of the intermediate layer of different examples prepared according to the specimen of FIG. 7(a)
Figure 7C:
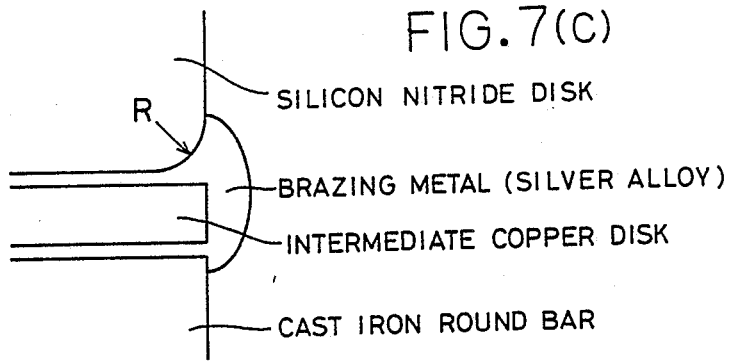

Examples 1 through 8 were prepared as shown in FIGS. 7(a), 7(b) and 7(c), according to the principle of the present invention. Described more specifically, each specimen of the Examples was prepared such that a ceramic member in the form of a disk of silicon nitride (Si₃N₄) having an outside diameter of 30 mm and a thickness of 10 mm was joined by brazing with two metallic members in the form of cast iron round bars by means of respective intermediate layers each in the form of a copper disk and a pair of brazing metal layers made of silver alloy interposed between the cast iron round bars and the silicon nitride disk. The peripheral portions of the opposite joining surfaces of the silicon nitride disk were rounded to an arcuate shape having an arc radius R of 0.5 mm or 1.0 mm, as indicated in Table 1.

In Examples 1, 2, 5 and 6, no brazing flux remained as a bead covering the periphery of the silicon nitride disk, as indicated in FIG. 7(b). In Examples 3, 4, 7 and 8, brazing flux remained as a bead covering the periphery of the disk, as indicated in FIG. 7(c). Each Example was observed for the brazing quality (separation and cracking), and was subjected to a tension test to obtain the mechanical failing tensile load.

Figure 8:
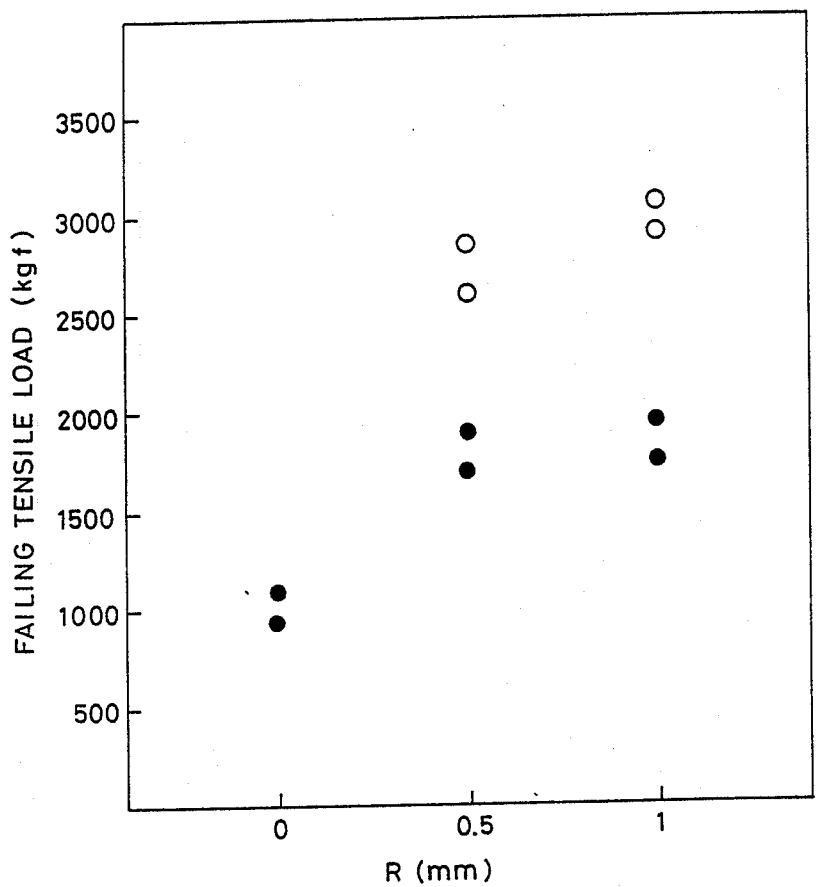
FIG. 8 is a graph illustrating a relationship between a mechanical failing tensile load and a radius (R) of arc of the rounded peripheral portion of the intermediate layer of the examples listed in Table 1.

The results of the observation and tension test of Examples 1-8 and Comparative Examples 9-11 are indicated in Table 1, and shown in FIG. 8. In Comparative Examples 9-11, the peripheral portions of the joining surfaces of the silicon nitride disk were simply chamferred to 0.1 mm, and brazing flux remained as indicated in FIG. 7(c). It will be understood from these table and figure that in Examples 1-9 the peripheral portions of the joining surfaces of the silicon nitride disk as the ceramic member according to the present invention did not suffer from cracking upon cooling of the assembly and exhibited relatively high levels of mechanical failing tensile load. To the contrary, Comparative Examples 9-11 wherein the silicon nitride disk was simply chamferred showed relatively poor results. That is, Example 9 experienced partial separation between the silicon nitride disk and the cast iron bars, and cracking at the joint. Examples 10 and 11 exhibited comparatively low mechanical failing tensile load values.

TABLE 1

| | Example No. | R (mm) | Brazing Flux *1 | Brazing Quality *2 | Mechanical Failing Tensile Load(kg · f) |
|---|---|---|---|---|---|
| Present Invention | 1 | 0.5 | A | o | 2850 |
| | 2 | 0.5 | A | o | 2600 |
| | 3 | 0.5 | B | o | 1700 |
| | 4 | 0.5 | B | o | 1900 |
| | 5 | 1.0 | A | o | 2900 |
| | 6 | 1.0 | A | o | 3050 |
| | 7 | 1.0 | B | o | 1950 |
| | 8 | 1.0 | B | o | 1750 |
| Comparative | 9 | 0.1 mm | B | x | — |
| | 10 | chamfer | B | o | 1100 |
| | 11 | | B | o | 950 |

*1 "A" indicates no brazing flux remaining as a bead covering the periphery of the silicon nitride disk. "B" indicates the brazing flux remaining as the bead.
*2 "x" indicates separation and cracking at the joint upon cooling of the joined metal-ceramic assembly.
"o" indicates good brazing quality without separation or cracking at the joint.

*1) "A" indicates no brazing flux remaining as a bead covering the periphery of the silicon nitride disk. "B" indicates the brazing flux remaining as the bead. *2) "x" indicates separation and cracking at the point upon cooling of the joined metal-ceramic assembly. "o" indicates good brazing quality without separation or cracking at the point.

What is claimed is:

1. A joined metal-ceramic assembly, comprising:
    a ceramic member;
    a metallic member; and
    an intermediate layer interposed between said ceramic member and said metallic member for abuttingly joining said ceramic member and said metallic member, said intermediate layer consisting of:
    (i) a metallic intermediate portion;
    (ii) a first brazing metal layer formed on a surface of said metallic intermediate portion; and
    (iii) a second brazing metal layer formed on an opposite surface of said metallic intermediate portion;
    wherein a joining surface of said ceramic member, at which said ceramic member is joined with said intermediate layer, includes a rounded peripheral portion having a substantially arcuate cross-sectional shape and at least half of said rounded peripheral portion is bonded to said first brazing metal layer.

2. A joined metal-ceramic assembly according to claim 15, wherein at least two-thirds of said rounded peripheral portion is bonded to said first brazing metal layer.

3. A joined metal-ceramic assembly according to claim 15, wherein said rounded peripheral portion is covered by a corresponding peripheral portion of said intermediate layer.

4. A joined metal-ceramic assembly according to claim 15, wherein said metallic member has a recess formed in a joining surface thereof, and said intermediate layer is accommodated in said recess.

5. A joined metal-ceramic assembly according to claim 4, wherein said recess of said metallic member has a larger size than an area of said joining surface of said ceramic member, as viewed in a plane parallel to said joining surface of said ceramic member.

6. A joined metal-ceramic assembly according to claim 5, wherein said rounded peripheral portion is covered by a corresponding peripheral portion of said intermediate layer.

7. A joined metal-ceramic assembly according to claim 15, wherein said ceramic member has a protrusion which defines a part of said joining surface.

8. A joined metal-ceramic assembly according to claim 7, wherein said metallic member has a recess formed in a joining surface thereof, a central portion of said intermediate layer being accommodated in said recess.

9. A joined metal-ceramic assembly according to claim 8, wherein said rounded peripheral portion is covered by a corresponding peripheral portion of said intermediate layer, which corresponding peripheral portion is not accommodated in said recess.

10. A method of producing a joined metal-ceramic assembly, comprising:
    forming a metallic member and a ceramic member, said ceramic member having a joining surface which includes a rounded peripheral portion;
    butting together said metallic member and said ceramic member via an intermediate layer interposed between a joining surface of said metallic member and said joining surface of said ceramic member; and
    joining together said metallic member and said ceramic member through said intermediate layer, such that at least half of said rounded peripheral portion of said joining surface of said ceramic member is bonded to said intermediate layer.

* * * * *